A. Stennel,
Harness Machine,
No. 731. Reissued May 31, 1859.
Fig 1.
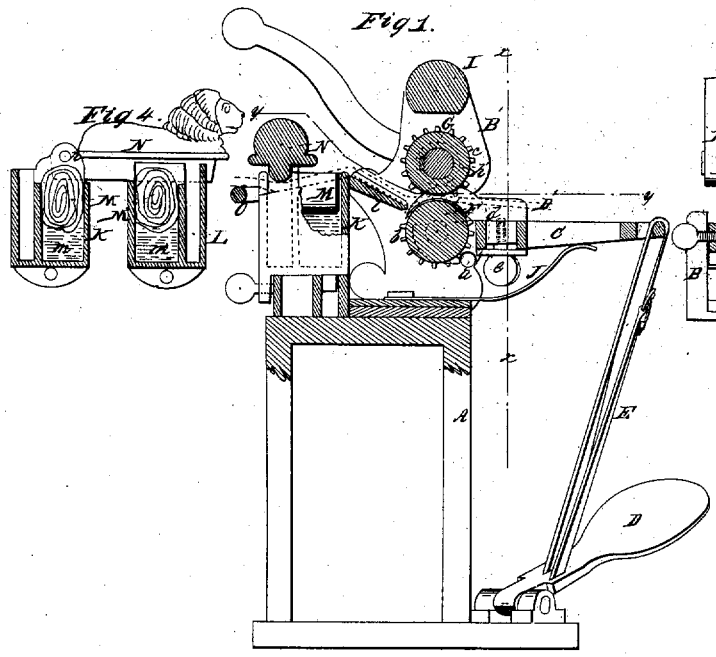
Fig 2.
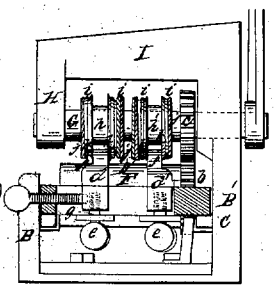
Fig 4.
Fig 3.
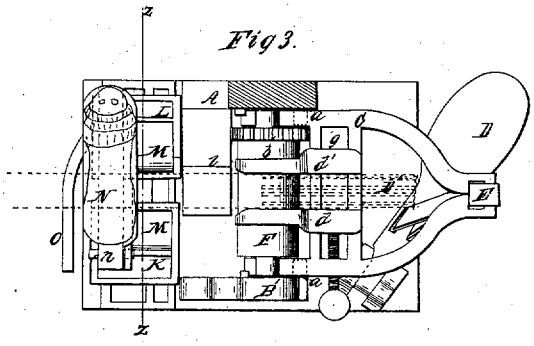
N. PETERS, PHOTO-LITHOGRAPHER, WASHINGTON, D. C.

UNITED STATES PATENT OFFICE.

ADOLPH STEMPEL, OF NEW YORK, N. Y.

MACHINE FOR CREASING AND BLACKING LEATHER FOR HARNESS.

Specification forming part of letters patent No. 21,989, dated November 2, 1858; Reissue No. 731, dated May 31, 1859.

*To all whom it may concern:*

Be it known that I, ADOLPH STEMPEL, of the city, county, and State of New York, have invented a new and Improved Machine for Creasing and Blacking Leather Straps; and I do hereby declare that the following is a full, clear, and exact description of the same, reference being had to the accompanying drawings, forming a part of this specification, in which—

Figure 1 represents a vertical central section of my invention. Fig. 2 is a transverse section of the same, taken in the line *x x*, Fig. 1. Fig. 3 is a horizontal section of the same, taken in the line *y y*, Fig. 1. Fig. 4 is a transverse section of the same, taken in the line *z z*, Fig. 3.

Similar letters of reference in all the figures indicate corresponding parts.

This invention consists in the employment or use of creasing and embossing rollers and a pressure-roller combined and arranged with two color-fountains provided with felt distributers, the whole being arranged substantially as hereinafter shown, for creasing, embossing, and coloring leather straps; and the invention also consists in a particular arrangement of the embossing-rollers, in combination with guides, whereby the edges of the straps are rounded off and kept straight, said rollers being provided with grooved edges and very thin and narrow flanges, which project down over the edges of the straps so as to form a part of the guides, which latter serve to adjust the rollers to the width of different straps and to prevent their moving in a lateral direction.

To enable those skilled in the art to make and use my invention, I will proceed to describe its construction and operation.

A represents a suitable framing, on the upper part of which two heads, B B′, are placed, between which a frame, C, is arranged, the frame working on pivots *a a* projecting from the inner sides of the heads B B′.

To the outer end of the frame C a treadle, D, is connected by a strap, E, and in the inner end of the frame C, at the opposite side of the pivots *a a*, a roller, F, is fitted, said roller being allowed to turn freely in its frame. The roller F is toothed at one end, as shown at *b*, and said teeth gear into a wheel, *c*, which is placed on one end of a roller, G, said roller having one of its journals fitted in the head B′, and the other journal in a pendant, H, attached to the end of a horizontal bar, I, which is secured to the upper end of the head B′. (See Fig. 2.)

In the frame C there are placed two guides, *d d′*, which are secured therein by set-screws *e e*. These guides have their inner ends curved and they project over the roller F, and their outer ends are fitted in a slot or opening, *g*, in the frame C. A spring, J, which is attached to the framing A, bears against the under side of the frame C, as shown in Fig. 1.

On the roller G there are placed two collars, *h h′*, which have a longitudinal sliding motion on the roller, being forced to rotate with the same by a key, *h**, and on both ends of each collar a roller, *i*, is formed or attached, said rollers having their outer edges or parts milled or formed, as shown at *j*, so as to produce ornamental embossed lines on the strap. (See Fig. 2.) The inner edges or parts of the rollers are grooved, as shown at *k*, so as to crease the strap, and these ends form a thin projecting flange, *k′*, which projects down on the side of the strap. The guides *d d* fit nicely between the rollers *i*, as clearly represented in Fig. 2, so as to prevent them from moving in a longitudinal direction on the shaft G, leaving them free, however, to rotate with this shaft, and the flanges *k′* extend down on the inside of the guides, so that the same in fact form a portion of the guides, and that the guides preserve the flanges against injury from a side pressure, as will be hereinafter more fully explained.

To the head B′ a plate, *l*, is attached, said plate being slightly inclined, and serving as a guide or support to the strap, and properly conducting or guiding the same to the rollers which operate upon it.

On the front part of the framing A there are placed two boxes, K and L, in which the usual or any proper coloring-substance is placed. In each box there is placed a roll of felt, M, said rolls projecting up above the inner sides of the boxes. The felt rolls M are saturated with the coloring-substance *m*, and their upper edges or surfaces are kept charged therewith by capillary attraction.

To the box K a bar, N, is attached by a hinge or joint, *n*. This bar serves as a weight, and keeps the strap in proper position as it passes through the machine.

O is a bar which serves as a support or bearing for the strap.

The operation is as follows: The strap, shown in red and designated by D′, is placed over the bar O, and under the weight or bar N, and passed between the saturated felt rolls M M, and then between the guides *d d′*, and between roller F and the rollers *i i*, which latter are adjusted at the proper distance, according to the width of the straps, by means of the guides *d d′*, which are secured in the desired spots by means of the set-screws *e e*. The flanges *h′* of the rollers *i i* pass down close by the sides of the guides, so in fact that these flanges constitute a portion of the guides, and the rollers and guides are brought so close together that the straps are pressed edgewise, and that their edges are kept perfectly straight, even when the straps are of unequal thickness, so that the different parts of the same are subjected to an unequal pressure while passing through between the roller F and the embossing-rollers *i*. At the same time the flanges *k* are protected against injury by the pressure exerted on them by the straps, they being so close to the guides that the latter sustain any pressure exerted on the flanges; and as the collars *h h* are provided with rollers on each end, the guides *d d*, which fit closely between the two rollers on the same collar, secure the same against any lateral movement, no extra fastening being required for the collars. The boxes K and L are also adjusted in line with the collars, and as the straps pass under the felt rolls M their surfaces are colored, and the edges of the straps are creased by the grooved edges *k* of the rollers *i*, and the corners of the straps are rounded by the action of these grooves, in combination with the flanges *k′*. The central portion of the strap is embossed or ornamented by the portion *j j* of the rollers *i*. The strap D′ is subjected to the requisite degree of pressure by depressing the treadle D with the foot, the guides *d d′* and the flanges *n′* preventing the strap spreading laterally, as above stated. The strap is made to enter between the rollers by turning the crank attached to the shaft G.

From the above description it will be seen that straps may be creased and embossed in an expeditious and perfect manner, and various forms of rollers *i* may be used according to the nature of the work to be performed, so that straps may be creased without being embossed. The rollers *i* on the two ends of the same collar *h* may be made of different form, so that by reversing the collars on the shaft G a change of work is effected.

I do not claim, broadly, the employment or use of creasing and embossing rollers in connection with a pressure-roller for ornamenting and creasing leather, for such device has been previously used; but

What I claim as new, and desire to secure by Letters Patent, is—

1. The pressure-roller F and the creasing and embossing rollers *i*, in combination with the color-fountains K and L, and felt rolls M M, arranged to operate as and for the purpose set forth.

2. The arrangement of the embossing-rollers *i* with thin projecting flanges *k′*, to operate in combination with the guides *d d′*, substantially in the manner and for the purpose specified.

ADOLPH STEMPEL.

Witnesses:
R. S. SPENCER,
J. W. COOMBS.